2 Sheets—Sheet 1.

J. MATTHEWS.

APPARATUS FOR DISPENSING SODA WATER, &c.

No. 9,875. Reissued Sept. 13, 1881.

Witnesses:
John E. Tumbridge
Willy L. de Schlitz

Inventor:
John Matthews
by his attorney
Geo. Dennison

2 Sheets—Sheet 2.

J. MATTHEWS.

APPARATUS FOR DISPENSING SODA WATER, &c.

No. 9,875. Reissued Sept. 13, 1881.

Witnesses:
John C. Trumbridge
Willy h. C. Schultz.

Inventor:
John Matthews
by his attorney
A. v. Briesen

UNITED STATES PATENT OFFICE.

JOHN MATTHEWS, OF NEW YORK, N. Y.

APPARATUS FOR DISPENSING SODA-WATER, &c.

SPECIFICATION forming part of Reissued Letters Patent No. 9,875, dated September 13, 1881.

Original No. 179,584, dated July 4, 1876. Application for reissue filed November 24, 1879.

*To all whom it may concern:*

Be it known that I, JOHN MATTHEWS, of the city, county, and State of New York, have invented certain new and useful Improvements in Apparatus for Dispensing Soda-Water, &c.; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention relates to apparatus such as is employed by druggists and others who dispense soda-water and sirups at retail, and embraces instrumentalities by which a great economy of space is secured on the dispensing-counter, the soda-water and other beverages are conveniently dispensed, and by which the soda-water tumbler is rapidly and conveniently pressed and held to the draft-cock, (particularly useful in cases where the aerated beverages are drawn into the tumbler under pressure.)

The invention also embraces instrumentalities by which the refrigerating effect of the ice is applied, so as to cool the sirups and beverages in large quantities and more efficiently than in the devices now in use; also, instrumentalities by which the ice-water from the ice-chamber of the apparatus is made available for washing and cooling the tumblers; instrumentalities by which economy of ice is effected, and instrumentalites by which the effective temperature of the liquid serving as a cooling medium in the ice-chamber is indicated on the exterior of the apparatus; instrumentalities by which the fluids entering and discharged from the apparatus are neatly and conveniently conveyed; instrumentalities by which the tumbler-washer is combined with the apparatus; instrumentalities by which the sirup can be expeditiously supplied and dispensed from the apparatus; instrumentalities by which economy of space in the disposition of the sirup-tanks and other parts of the apparatus is attained, and instrumentalities by which breakage of the doors of the apparatus is avoided and the durability of the apparatus increased.

Figure 1:
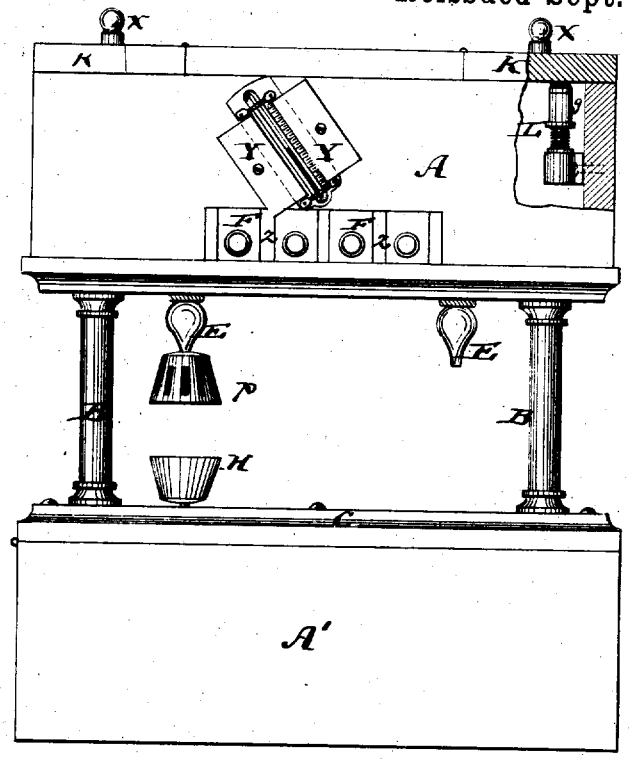
Figure 2:
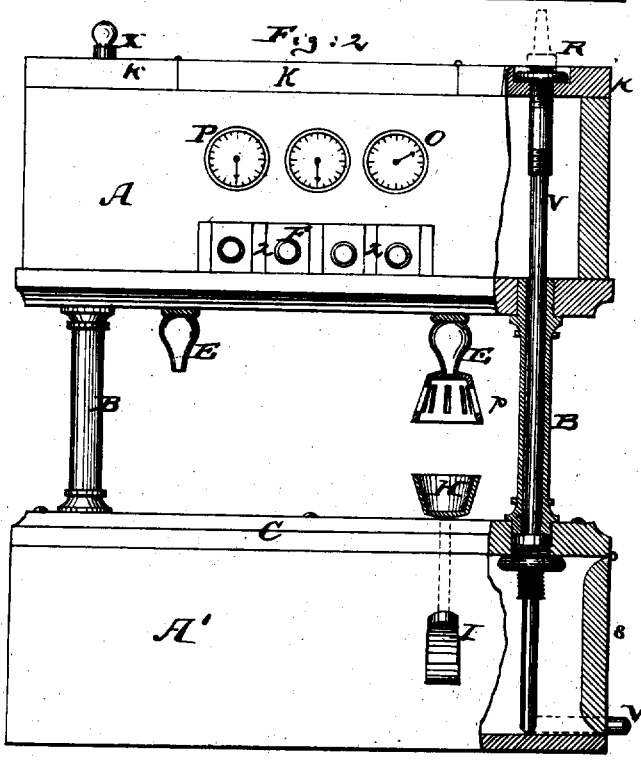
Figure 5:
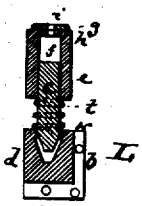
Figure 4:
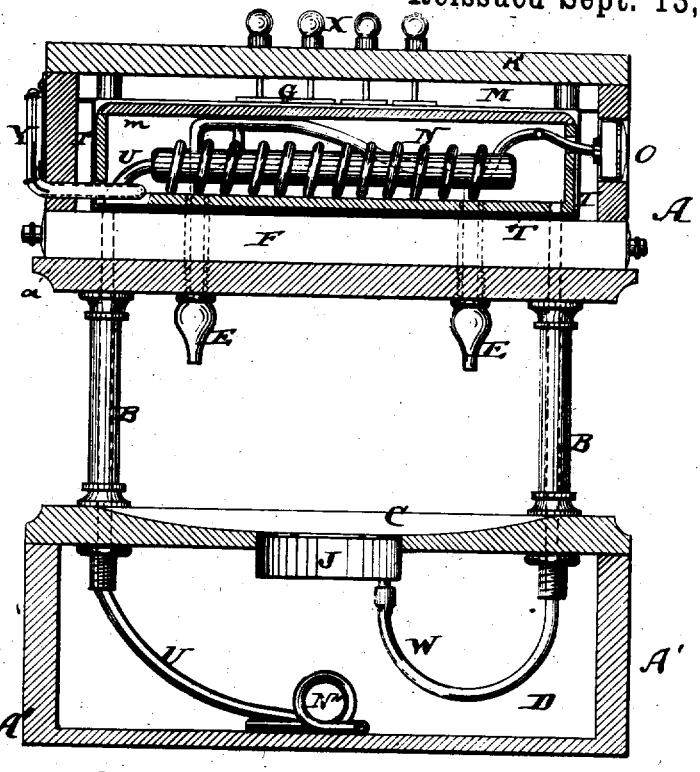
Figure 3:
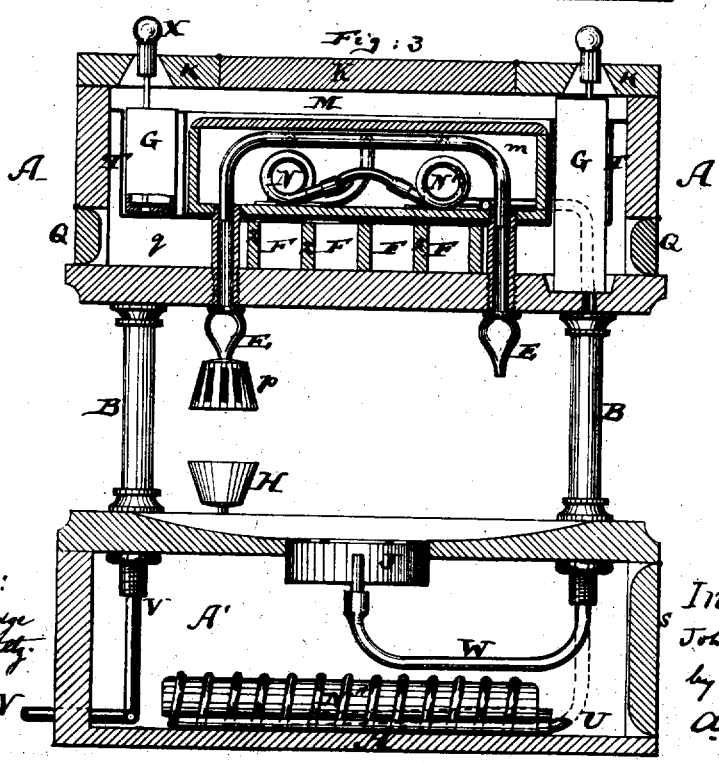

In the accompanying drawings, Figures 1 and 2 are side elevations of my apparatus, partly in section; and Figs. 3 and 4 cross vertical sections of Figs. 1 and 2 respectively; Fig. 5, a detail sectional view of dash-pot.

A represents the main body of the apparatus; B, hollow columns sustaining the main body, said columns standing on the counter C, upon which the beverages are dispensed; E, the dispensing-faucets for the aerated beverages; F, horizontal sirup-tanks; G, upright sirup-tanks; H, tumbler-carrier; *p*, cap or hood to connect tumbler with faucet; I, treadle to raise tumbler-carrier; J, tumbler-washer; K, cover of apparatus, *k k* being the doors of cover; L, dash-pot to prevent slamming of the marble covers of the apparatus; M, ice-chamber, of non-absorbent and non-conducting material; N′ N N″, coolers for cooling the aerated beverages; O, pressure-gage connected with cylinder of cooler; P, pressure-gage connected with tube leading to the draft-arm; Q, door of tumbler-chamber; S, door of supplementary cooling-chamber D; T, metallic jacket-case, exterior to non-conducting case in ice-chamber; U, supply-pipe for aerated beverage; V, supply-pipe for illuminating-gas; W, drain-pipe from the ice-chamber; X, knobs by which discharge-valves in upright sirup-tanks are operated; Y, thermometer to record temperature of liquid in cooling-chamber; Z, partitions of stalls for sirup-tanks.

I effect a great economy of space on the dispensing-counter by constructing the main body of the apparatus A so that it is sustained above its base by hollow columns B, through which the pipes U, conveying the beverage to the nozzles E, are conducted. This renders the space upon the base beneath the apparatus available for a tumbler-washer, J, and tumblers, and brings the draft-faucets E beneath the body of the apparatus, thus enabling the base of the apparatus to form a drainer, by which all the drippings from the faucets may be kept within the space occupied by the apparatus. The view of the customers and of the store is less obstructed by this arrangement. The beverages are more conveniently dispensed by thus arranging the body of the apparatus above the counter, between hollow conducting-columns, as all the dispensing-faucets are thus brought within a convenient space and have their outlets more equally accessible than in apparatus where the faucets are arranged on several sides of the apparatus. The beverage, when drawn, can be passed by the attendant to the purchaser when in positions inaccessible in apparatus of ordinary construction. The draft-faucets being beneath the body of the apparatus enables the operator to use a tumbler-carrier, H, operated by a treadle, I, to hold the tumbler to the dispensing-nozzle. This is particularly useful where the soda-water is drawn under pressure, as in my improvement protected by Letters Patent granted June 25, 1872, and numbered 128,410. By arranging the tumbler-washer beneath the ice-chamber of the apparatus a sufficient descent for the ice-water is obtained to enable it to be of use as a supply for the tumbler-washer, and also as a means of keeping the washing-water cool. The ice-water is conveyed by a tube, W, passing through the column upon which the body of the apparatus is sustained, and is connected with the tumbler-washer below the base. Great economy of water and advantage as to cooling the tumblers are thus obtained by uniting the tumbler-washer and drainer J with the ice-chamber M.

I construct the coolers of my apparatus as follows:

N′ is the storage-cylinder, issuing from one end of which is a tube coiled around the outside of the storage-cylinder. The beverage to be cooled enters the storage-cylinder at such an angle as to cause the stream to impinge against the inside of the cylinder-wall, sweeping around the cylinder as a flat helical current, and leaving the cylinder at the other end by the coiled tube, and passing around the cylinder through the tube, and from thence to another cooler, N, constructed in a similar manner, forming a series onto the dispensing-valve. The pipe coiled on the exterior of the storage-cylinder is coiled tightly against the cylinder and secured to it by soldering or other support; but sufficient space is left between each coil to allow the ice to penetrate between the coils to the cylinder, and so that the impurities contained in the ice are readily washed away by the ice-water, and not lodged between the coils, nor upon the cylinder, as these deposits greatly impair the refrigerating effect of the ice upon the beverages. The pipes thus coiled also assist in sustaining the pressure upon the walls of the storage-cylinder and prevent the swelling of the cylinder by pressure. These coolers lie horizontally within the ice-chamber, and are immersed in the water from the melting ice to an extent equal to about one-half their diameter. The level of the water is maintained by an overflow-pipe. This water is cooled by the water rotating in the cylinder and coiled pipe, and acts as a reservoir of cold in a most effectual cooling medium. In coolers of ordinary construction such a reservoir cannot be effectively used, because those portions of water reduced to a low temperature by the ice are not swept through the reservoir of water by currents which alternately reach those portions of the coolers in direct contact with the ice and the reservoir of water.

A cooler constructed according to my improvement is efficient as a cooler on all sides, because the water in which the cooler is partly or wholly immersed is kept cold by currents in the cylinder and coil, which act alternately upon the ice and the ice-water reservoir. The presence of water in the ice-chamber is generally objectionable, as by reason of its extensive contact with the metallic lining of the ice-chamber much heat is conveyed to it, and though ice is thus rapidly melted, but little useful effect is obtained, and generally the beverages cannot be drawn as cold as when the ice-water is absent.

I avoid these difficulties by a lining of non-absorbent and non-conducting material, M, placed within the external case and water-tight lining, such non-absorbent and non-conducting material being directly in contact with the coolers and ice and forming the walls of the chamber. For this purpose I use preferably a light wood or other porous or fibrous material, well dried and saturated with paraffine or other equivalent material, or any material—such as gutta-percha, india-rubber—which is non-absorbent and a poor conductor of heat.

In my improvement the metal jacket T acts as the water-tight receptacle, the non-absorbent lining being simply placed within it; or the non-absorbent lining may itself be made water-tight, and thus dispense with the metallic jacket. As the wood, if saturated with paraffine or other oily or equivalent substance, where used against the marble might stain it, I cover the prepared wood with a metallic foil or sheet where it is in contact with the marble.

For reasons already stated, and indeed obvious, it is desirable to know the effective temperature of the ice-chamber without the difficulty of opening the apparatus. I therefore construct my apparatus with a thermometer, Y, having its bulb immersed in the ice-water reservoir, and protected by a casing to prevent fracture, and its graduated scale so exposed as to read on the exterior of the apparatus.

The columns sustaining my apparatus serve as a means by which the fluids entering the apparatus, and the drainage-water from the ice-chamber, and condensed water which may lodge upon the plate of the apparatus, are conveyed in a neat and convenient style to and from the apparatus.

To bring the tumbler-washer J within a convenient space, and to make it a useful part of my apparatus, I construct the base A′ of my apparatus with the upper surface having inclination toward that part of the base where the tumbler-washer is placed, so that all drip from the faucets is conveyed to the tumbler-washer. The tumbler-washer is supplied with water in the usual manner, and besides is connected by the pipe W, which conveys the water from the ice-chamber and other parts of the apparatus. This serves to keep the water in the tumbler-washer, and furnishes a considerable quantity of water for washing purposes. The tumblers are thus kept cooler and cleaner than without such additional source of water.

In my improved apparatus I arrange the sirup-cans as follows:

F F F F are the horizontal sirup-tanks, which lie below the ice-chamber and rest upon the plate of the apparatus. These tanks are provided with faucets at one end, from which the sirups are dispensed, and at the top, at either end, are perforated with an orifice. To fill with sirups the tanks are drawn out till the supply-orifice is accessible.

To dispense the sirups the tanks may be drawn out a short distance to bring the discharge-vent over the tumbler.

The plate *a* may be perforated to permit the discharge of sirups through the plate, in which case the discharge-valve is operated within the tank by means of a lever or connecting-rod accessible from the outside; or the sirup-faucets may project from the tanks sufficiently to permit the tumblers to be supplied with sirup from the sirup-discharge vents. This arrangement of sirup-tanks permits the use of a portable tank, and which can readily be removed for cleansing, &c.

G G G G represent upright portable tanks with two methods of operating the same in the long series. The sirups are dispensed through orifices in the plate *a*, the valve being operated by stems X, passing through projections in the apparatus provided with covers. The other upright portable tanks are shorter, and dispense the sirup in a tumbler-chamber, *q*, which is accessible by means of a door, Q, the tumblers being brought in each case to the required position by means of a tumbler-guide, as shown in my patent dated October 3, 1865, and numbered 50,225. The upright portable tanks of both series operate as described in that patent. This arrangement of the sirup-tanks permits of their disposition so as to occupy all space in the apparatus not needed for other portions, and makes available the space usually lost in apparatus resting on the counter in the usual manner.

I avoid the breakage of the covers and doors of the apparatus, which in ordinary apparatus is of frequent occurrence, by providing the apparatus with a dash-pot, which receives the covers and permits them to close gradually, thus avoiding all shock to the marble portions.

I construct the dash-pot as follows. (See Figs. 1 and 5:)

*d* represents a socket, firmly secured to the apparatus. *b* is the flange by which it is secured.

*c* is the piston of the dash-pot, its lower end resting in the socket-body, so as to permit a slight movement upon the pin.

*k* is a flange which supports the spring *t*.

*e* is the cylinder, fitting close upon the piston, although not absolutely air-tight.

*g* is a buffer, of india-rubber or other elastic material, to receive the cover or door.

The upper part of the cylinder is perforated by a small orifice, which is also carried through the rubber buffer.

*f* is the air-space within the cylinder when it is raised upon the piston by the spring *d*.

The operation of the dash-pot is as follows: The door being open, the cylinder is raised by the spring *d*, the air passing through the orifice *i* at the top of the cylinder. The door of the apparatus being closed, it first strikes the rubber buffer *g* and closes the air-orifice *i*. The weight or pressure of the door forces down the cylinder and compresses the air within the space *f*, and the cover or door slowly settles to its place without shock as the air gradually escapes between the piston and the cylinder. In some cases I prefer to bore a small hole in the cylinder, to permit the air to escape more freely. The pin and socket at the lower end permit a small movement of the dash-pot, which, owing to the arc described by the door working on hinges, requires this equivalent mode of compensation or adjustment of the dash-pot. When the door is raised the cylinder of the dash-pot is raised by the spring. The air entering through the orifice permits the dash-pot to rise quickly, in order that it may be at once ready to receive the cover or door if it should soon be closed. The dash-pot would rise very slowly if not vented, and in some cases would not in time receive sufficient air to cushion the door.

I have shown only two draft-faucets. Any required number may be used to accommodate the different kinds or amounts of liquid to be drawn. So of the pressure-gages, coolers, tumbler-washers, dash-pots, and other individual parts of the apparatus.

Having thus described my invention, what I claim, and desire to secure by Letters Patent, is—

1. The combination of the body A of the dispensing apparatus for aerated beverages with hollow columns B and with the counter or table C, substantially as herein shown and described.

2. A dispensing apparatus supported on hollow conducting-columns B, standing on the counter C, the discharge-faucets being suspended between said hollow columns above a depression in the top of the counter, substantially as herein shown and described.

3. The combination of a tumbler-carrier provided with elevating mechanism with a draft-faucet to draw the liquid into the tumbler under pressure, substantially as described.

4. The combination of the tumbler-washer with the cooling-chamber, said tumbler-washer being placed below the cooling-chamber to allow working-space between the two, as set forth.

5. In a soda-water apparatus, the cooler herein described, composed of one or more reservoirs, N, surrounded by and combined with a coiled pipe for operation in a cooling medium, substantially as described.

6. The ice-chamber composed of a non-absorbent and non-conducting lining placed within and combined with a metallic case, and the whole surrounded by a casing containing the several parts of a soda-water apparatus, as described.

7. In combination with the cooling-chamber of a soda-water apparatus, a thermometer having its bulb inside the cooling-chamber and its stem or index outside in a protecting-casing, so as to be easily read by the attendant, as set forth.

8. The separated hollow columns B, connecting and in combination with the dispensing apparatus, and counter or base C, having depressions in top, said columns serving as conductors for the pipes for liquids and gas, and as supports for the apparatus on the counter, as set forth.

9. The tumbler-washer J, arranged in the top of the base and beneath the cooler, so as to receive the ice-water, in combination with said base and cooler, as set forth.

10. The combination, in a box or chest of a soda-water apparatus, of the case M with coolers N and sirup-fountains F G, as set forth.

11. One or more dash-pots, L, arranged under and combined with the covers of the ice-chamber so as to prevent breakage, substantially as set forth.

12. The combination of treadle I, tumbler-holder H, and hood *p*, as set forth.

13. The combination of the tumbler-washer J, tube W, and ice-chamber M, as set forth.

14. In an apparatus for dispensing soda-water, &c., a hollow overarched or bridged structure supporting the dispensing apparatus, with the ends of the arch or bases of the supporting-columns resting on the tablet or slab, leaving the spaces bounded by said structure and the slab practically unobstructed.

15. In an apparatus for dispensing soda-water, &c., a hollow overarched or bridged structure supporting the dispensing-faucet, with the ends of the arch or bases of the supporting-columns resting on the tablet or slab, leaving the space bounded by said structure and the slab practically unobstructed.

16. The elevated hollow case A, combined with hollow columns B, counter or slab C, and with the supply-pipe U and drain-pipe W passing through said columns, substantially as herein shown and described.

JOHN MATTHEWS.

Witnesses:
AUGUSTINE X. BUTLER,
TOMPSON B. MOSHER